W. M. Whittaker.
Butter Dish,

N°. 60,308.          Patented Dec. 4, 1866.

Witnesses:
John H. Shumway
A. J. Tibbets

Inventor:
W. M. Whittaker
By his atty
John E. Earl

United States Patent Office.

IMPROVED BUTTER DISH.

WILLIAM M. WHITTAKER, OF WALLINGFORD, CONNECTICUT, ASSIGNOR TO HIMSELF AND AND B. CHURCH, OF SAME PLACE.

Letters Patent No. 60,308, dated December 4, 1866.

SPECIFICATION.

TO ALL WHOM IT MAY CONCERN:

Be it known that I, WILLIAM M. WHITTAKER, of Wallingford, in the county of New Haven, and State of Connecticut, have invented a new improvement in Butter Dish; and I do hereby declare the following, when taken in connection with the accompanying drawings and the letters of reference marked thereon, to be a full, clear, and exact description of the same, and which said drawings constitute part of this specification, and represent in—

Figure 1:
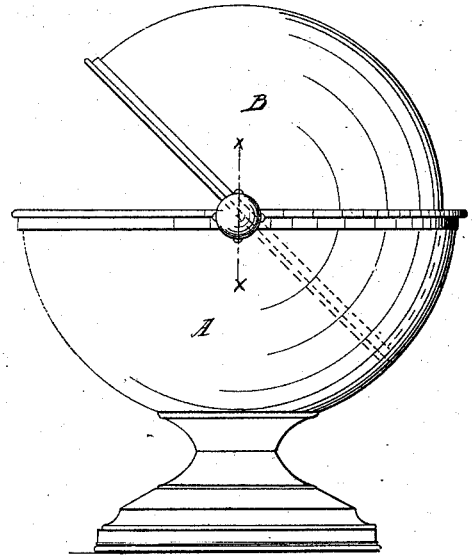

Figure 1, a side view of the dish, partially opened.

Figure 2:
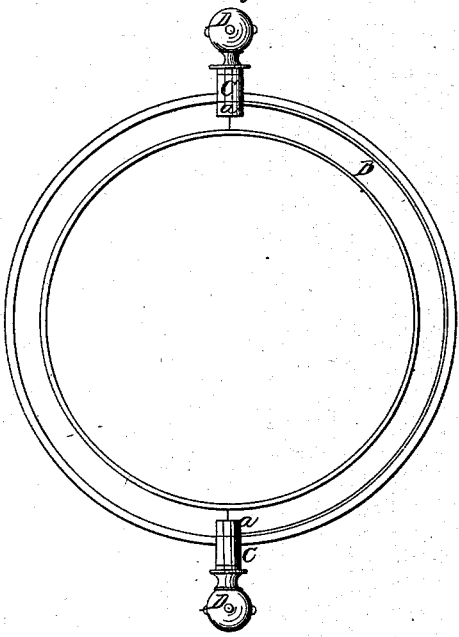
Figure 3:
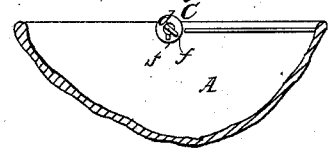

Figure 2, a top view, fully opened; and in

Figures 3, 4, 5, and 6, detached views and parts, to illustrate the construction and operation.

This invention relates to what is known as the revolving cover butter dish, and consists in the peculiar arrangement for attaching the cover to the dish so that it may be removed from the dish, when required, without entirely removing the pivot, as in the common construction.

Figure 4:
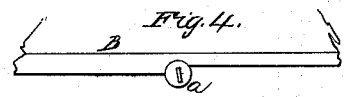
Figure 5:
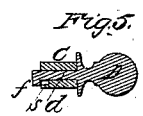
Figure 6:

To enable others to construct my improvement, I will proceed to describe the same as illustrated in the accompanying drawings:

A is the bowl, and P the cover, of any desired or known form or design. The bowl is formed so that the cover pivoted at C will swing between the outer and inner case of the bowl, as denoted in fig. 1, and so as to open entirely, as in fig. 2. Upon the cover I form ears $a$, as seen in figs. 2 and 4, and upon the bowl, corresponding ears C. (See figs. 2 and 3.) And through the ears C, I pass a pivot $d$, provided on its outer end with a knob D, or other convenience, for turning the pivot. The inner end of the pivot is formed flat and thin, and so as to form a shoulder, $f$. (See figs. 5 and 6.) And the ear C is formed with a notch, $s$, into which the shoulder $f$ may be drawn, as, see fig. 6, so that the inner end of the pivot will come flushly with the inner surface of the ear. This notch $s$ is formed directly below the pivot, so that only when the shoulder $f$ is perpendicular it can be withdrawn, and so that when turned away from the said notch, as in fig. 3, the pivot cannot be withdrawn. In each of the ears $a$ upon the cover a mortise is formed, as seen in fig. 4, to receive the flat end of the pivot, so that when the cover is placed in its proper position, and the pivots pressed inward, the flatted ends of the pivot enter the mortise in the ears $a$, so that by turning the pivot the cover will also be turned. Were the mortises in the ears $a$ and the notches in the ears C exactly perpendicular and corresponding, the pivots could be withdrawn when the cover was closed, which would be an objection to this manner of pivoting. To avoid this I make the mortise in the ears $a$ diagonal, so that they will correspond to the notches in the ears C only when the cover is partially open, as seen in figs. 1 and 4, so that when the cover is open or closed, the pivot cannot be withdrawn, and therefore is not liable to displacement; but when it is desired to remove the cover for any purpose, raise the cover until the mortise in the ears $a$ corresponds to the notch in the ears C, whatever that position may be; then the pivots may be withdrawn, and the cover removed.

Having, therefore, thus fully described my invention, what I claim as new and useful, and desire to secure by Letters Patent, is—

The combination of the pivot $d$ and the ears C and $a$, when constructed and arranged, so as to operate substantially in the manner herein set forth.

WM. M. WHITTAKER.

Witnesses:
 JOHN M. SHUMWAY,
 A. J. TIBBITS.